(12) United States Patent
Su et al.

(10) Patent No.: US 9,047,674 B2
(45) Date of Patent: Jun. 2, 2015

(54) STRUCTURED GRIDS AND GRAPH TRAVERSAL FOR IMAGE PROCESSING

(75) Inventors: Bor-Yiing Su, Albany, CA (US); Tasneem G. Brutch, Lincoln, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 871 days.

(21) Appl. No.: 12/687,013

(22) Filed: Jan. 13, 2010

(65) Prior Publication Data

US 2011/0103712 A1    May 5, 2011

Related U.S. Application Data

(60) Provisional application No. 61/257,736, filed on Nov. 3, 2009.

(51) Int. Cl.
  *G06K 9/46*    (2006.01)
  *G06T 1/20*    (2006.01)

(52) U.S. Cl.
  CPC ........................................ *G06T 1/20* (2013.01)

(58) Field of Classification Search
  None
  See application file for complete search history.

(56) References Cited

U.S. PATENT DOCUMENTS

| | | | | |
|---|---|---|---|---|
| 5,332,968 | A * | 7/1994 | Brown | 324/309 |
| 5,657,362 | A * | 8/1997 | Giger et al. | 378/37 |
| 6,766,038 | B1 * | 7/2004 | Sakuma et al. | 382/107 |
| 7,227,893 | B1 | 6/2007 | Srinivasa et al. | |
| 7,428,331 | B2 | 9/2008 | Bhattacharjya | |
| 7,444,019 | B2 * | 10/2008 | Boykov et al. | 382/173 |
| 7,536,064 | B2 * | 5/2009 | Venkatesan et al. | 382/305 |
| 7,676,091 | B2 * | 3/2010 | Zwirn et al. | 382/182 |
| 7,689,038 | B2 * | 3/2010 | Zahniser | 382/180 |
| 7,864,365 | B2 | 1/2011 | Campbell et al. | |
| 7,881,532 | B2 * | 2/2011 | Zahniser | 382/180 |
| 7,969,884 | B1 * | 6/2011 | Venables et al. | 370/235 |
| 8,265,368 | B2 * | 9/2012 | Ihara | 382/131 |
| 8,368,956 | B2 | 2/2013 | Campbell et al. | |
| 2003/0068074 | A1 * | 4/2003 | Hahn | 382/128 |
| 2003/0077001 | A1 * | 4/2003 | Yamashita et al. | 382/276 |

(Continued)

OTHER PUBLICATIONS

Meijster, A. and Roerdink, J. B., "*A proposal for the implementation of a parallel watershed algorithm*," Computer Analysis of Images and Patterns, V. Hlavac and R. Sara, Eds.New York-Heidelberg -Berlin, 790-795, 1995.

(Continued)

*Primary Examiner* — Tsung-Yin Tsai
(74) *Attorney, Agent, or Firm* — Sherman IP LLP; Kenneth L. Sherman; Hemavathy Perumal

(57) ABSTRACT

An image represented by multiple nodes can be processed by determining whether information can be propagated to a node from another node (e.g., source node) of the image, thereby allowing significantly greater parallelism and scalability by taking advantage of multiprocessing or multi-core processors that are prevalent and widely available today. Conceptually, an image can be presented as a "structured grid" of multiple nodes (e.g., a structured grid of pixels of an image). In a "structured grid," two or more of the nodes can determine whether to propagate information in parallel. In fact, each node of a "structured grid" can perform operations relating to propagation of information in parallel. This means that for an image of N pixels, it is possible to perform N operations in parallel. It is also possible to divide the processing of N operations for N pixels substantially equally between the number processors or processing cores available at a given time.

21 Claims, 8 Drawing Sheets

(56) References Cited

U.S. PATENT DOCUMENTS

| | | | |
|---|---|---|---|
| 2005/0213837 A1* | 9/2005 | Boykov et al. | 382/253 |
| 2005/0238229 A1* | 10/2005 | Ishidera | 382/165 |
| 2007/0058863 A1* | 3/2007 | Boregowda et al. | 382/170 |
| 2007/0242900 A1* | 10/2007 | Chen et al. | 382/294 |
| 2007/0291120 A1 | 12/2007 | Campbell et al. | |
| 2008/0019587 A1* | 1/2008 | Wilensky et al. | 382/159 |
| 2008/0123945 A1* | 5/2008 | Andrew et al. | 382/164 |
| 2009/0022403 A1* | 1/2009 | Takamori et al. | 382/195 |
| 2009/0225189 A1* | 9/2009 | Morin | 348/229.1 |
| 2010/0189367 A1* | 7/2010 | van der Merwe et al. | 382/217 |
| 2010/0191716 A1* | 7/2010 | Chen et al. | 707/713 |
| 2010/0192148 A1* | 7/2010 | Chen et al. | 718/1 |
| 2011/0103711 A1 | 5/2011 | Su et al. | |

OTHER PUBLICATIONS

Moga, A. N., and Gabbouj, M., "*Parallel Image Component Labeling With Watershed Transformation,*" IEEE Transactions on Pattern Analysis and Machine Intelligence, vol. 19, No. 5, 441-450, 1997.

Bieniek, A., Burkhardt, H., Marschner, H., Nolle, M., and Schreiber, G., "*A Parallel Watershed Algorithm,*" Technical Report. UMI Order No. TR-402-96-006., Universitaet Hamburg, 1996.

H. Zhou, Y. Jiang, X. Yang, "*An Improved Parallel Watershed Algorithm for Distributed Memory System,*" Fifth International Conference on Algorithms and Architectures for Parallel Processing (ICA3PP'02), 310-313, 2002.

Meyer, F., "Topographic Distance and Watershed Lines", Signal Processing, Jul. 1994, pp. 113-125, vol. 38, No. 1, Elsebier North-Holland, Inc., Amsterdam, The Netherlands.

An, P. et al., "STAPL: An Adaptive, Generic Parallel C++ Library", Proceedings of the 14th International Workshop on Languages and Compilers for Parallel Computing (LCPC '01), Aug. 2001, pp. 193-208, vol. 2624, Springer Berlin Heidelberg, Germany.

Heilscher, F. et al., "ParGraph", http://pargraph.sourceforge.net/, Oct. 2004, p. 1, Sourceforge.net, USA.

Gregor, D. et al., "The Parallel BGL: A Generic Library for Distributed Graph Computations", Proceedings of the 2005 Parallel Object-Oriented Scientific Computing (POOSC '05), Jul. 2005, pp. 1-18, vol. 14, No. 2, IOS Press Amsterdam, The Netherlands.

Intel Corporation, "Intel® Cilk™ Plus | Intel® Developer Zone", http://software.intel.com/en-us/intel-cilk-plus, downloaded Feb. 28, 2013, pp. 1-2, Intel Corporation, USA.

Leiserson, C.E. et al., "Introduction to Cilk++ Programming", PowerPoint Presentation, Jul. 2009, slides 1-60, Charles E. Leiserson and Pablo Halpern, USA.

U.S. Non-Final Office Action for Application U.S. Appl. No. 12/686,999 mailed Dec. 13, 2012.

U.S. Final Office Action for Application U.S. Appl. No. 12/686,999 mailed Mar. 19, 2013.

U.S. Notice of Allowance for Application U.S. Appl. No. 12/686,999 mailed Sep. 9, 2013.

\* cited by examiner

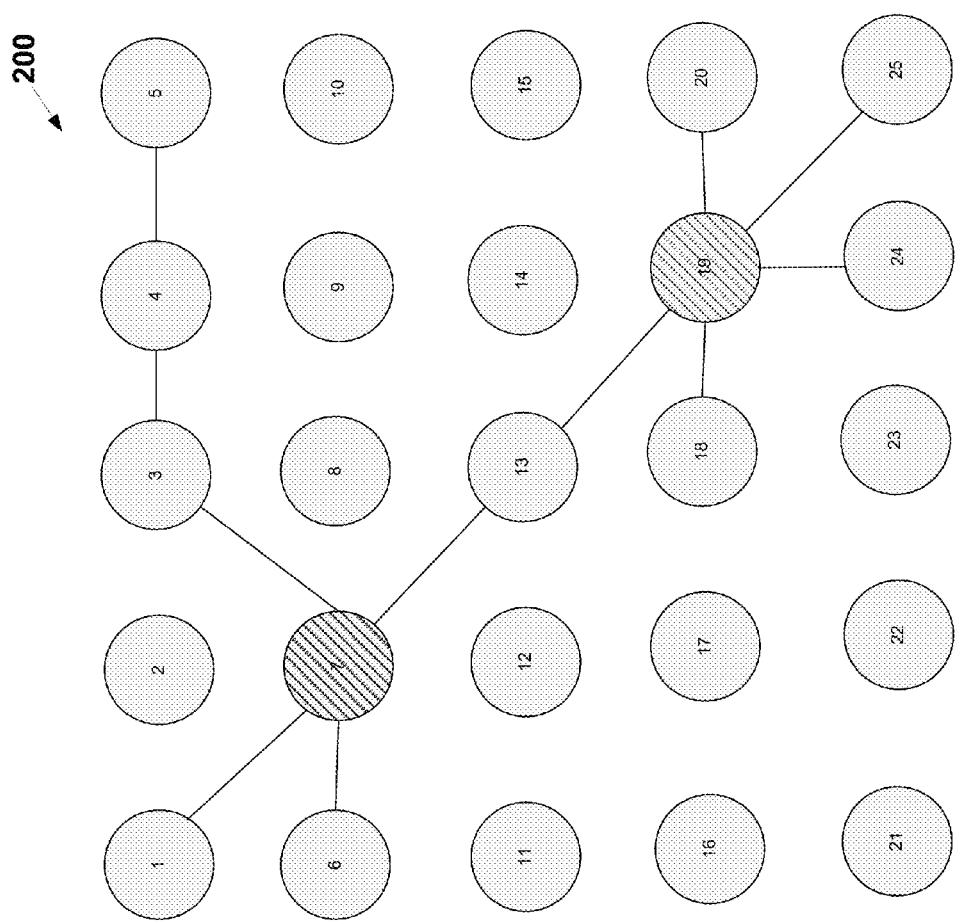

Previous Stage         Current Stage

Fig. 4C

STRUCTURED GRIDS AND GRAPH TRAVERSAL FOR IMAGE PROCESSING

CROSS REFERENCE TO RELATED APPLICATIONS

This application claims the benefit of priority under 35 U.S.C. §119(e) to U.S. Provisional Patent Application No. 61/257,736, by SU et al., filed on Nov. 3, 2009, entitled "IMAGE PROCESSING TECHNIQUES USING STRUCTURED GRIDS." In addition, this application is related to U.S. patent application Ser. No. 12/686,999 (now U.S. Pat. No. 8,630,509 issued on Jan. 14, 2014), by SU et al., entitled "STRUCTURED GRIDS FOR LABEL PROPAGATION ON A FINITE NUMBER OF LAYERS." All of the foregoing applications are hereby incorporated herein by reference in their entirety and for all purposes.

BACKGROUND

Conceptually, a computing system (e.g., a computing device, a personal computer, a laptop, a Smartphone, a mobile phone) can accept information (content or data) and manipulate it to obtain or determine a result based on a sequence of instructions (or a computer program) effectively describing how to process the information. Typically, the information is stored in a computer readable medium in a binary form. More complex computing systems can store content including the computer program itself. A computer program may be invariable and/or built into, for example, a computer (or computing) device as logic circuitry provided on microprocessors or computer chips. Today, general purpose computers can have both kinds of programming. Storing content (or information retention) is of one the core functions of computing devices. Today, numerous types of computing devices are available. These computing devices widely range with respect to size, cost, amount of storage and processing power. The computing devices that are available today include: expensive and powerful servers, relatively cheaper Personal Computers (PC's) and laptops, and yet less expensive microprocessors (or computer chips) provided in storage devices, automobiles, and household electronic appliances. Memory and storage devices have long been an important part of computing and computing devices. Memory and storage device technology have been markedly improved in recent years. Today, relatively large amounts of content can be stored in portable and easy to access devices such as USB flash drives (or USB flash devices). The content stored on USB flash drives can be easily carried and copied on to various computing devices. By way of example, data stored on a server computer can be copied on to a USB flash drive and taken home and loaded (or copied) on to a Personal Computer (PC).

Among other things, computing systems can be used for image processing. Generally, image processing can be any form of signal processing where the input is an image (e.g., photographs, frames of video). The output of image processing can also be an image or a set of characteristics or parameters related to the image. Image processing techniques can involve treating the input image as a two-dimensional signal and applying standard signal-processing techniques to it. Image processing techniques can also be used to process a 3-D image. An image can be represented as a graph which can be "traversed" in order to process the image. During graph traversal, information can be propagated between the nodes of the graph.

Often, image processing refers to digital image processing as the use of computer (or computer-based) algorithms to process digital images. As a subfield of digital signal processing, digital image processing has many advantages over analog image processing, as it allows a wider range of algorithms to be applied to the input, as well as avoiding various problems associated with analog image processing (e.g., build-up of noise, signal distortion during processing).

Digital image processing is widely recognized by the scientific community and used by those in the general public accustomed to digital cameras, digital image editing, and the like. As such, digital image processing techniques are very useful as evidenced by their use in various forms and in many different applications. Digital imaging can be realized or achieved using a computing system (e.g., a computer). For example, a computer can execute (or run) an executable computer program to recognize objects in various digital images stored in a database.

In digital image processing, an image (I) can be represented by a graph "G=(V, E)" where "V" represents a set of nodes and "E" represents the edges of the graph. In the graph "G=(V, E)" each vertex v is a subset of nodes (V) (v∈V) that can, for example, represent a pixel of the image (I) or a set of pixels in the image (I). The edges (E) can represent the relationship between the pixels or pixel groups. By way of example, the image (I) can be represented by performing the following operations: (i) for each pixel in the image (I), use a vertex to represent a pixel, (ii) for each pixel vertex, connect it with its north, south, east, and west neighboring pixel vertices by edges. The result is a connected graph representing the image (I) with neighboring relationships of its pixels. Similarly, a 3D image can be also represented by a graph with v∈V representing a voxel or a set of voxels with a set of edges (E) representing the relationship between the voxels or voxel groups. Given a graph G=(V, E) and a set of source vertices (S) as a subset of the nodes (V) (S⊆cV) "graph traversal" can refer to "walking" from the source vertices (S) to other vertices following the edges (E) of the graph until a termination criterion is satisfied (e.g., all the vertices in V have been visited).

A Breadth First Search (BFS) graph traversal algorithm can be defined as follows. Let u and v be two vertices in the graph "G=(V, E)," u and v are neighbors if and only if there exists an edge connecting vertex u and vertex v. For a vertex u, let "N(u)" be the set of neighboring nodes of u. For a set of vertices U, let $$"N(U) = \bigcup_{u \in U} N(u)".$$

Given a graph "G=(V, E)" and a set of source vertices S⊆V, a BFS graph traversal algorithm can be performed by traversing the graph iteratively, such that for the first iteration, all vertices in "N(S)" are visited and for the second iteration "N(N(S))" is visited, and for the third iteration "N(N(N(S)))" is visited, and so on.

Digital image processing can require many computations. As such, digital image processing can be a computationally intensive process. Object recognition, which generally requires graph traversal, is an example of a digital imaging process that can be very computationally intensive. As a key technique for analyzing images, object recognition, among other things, can be used to classify objects in digital images. The digital images can, for example, be stored in a database. However, more accurate object recognition techniques are relatively more computationally intensive, as is generally known in the art.

Given that digital imaging is widely used for numerous applications today, alternative techniques for image processing would be useful.

SUMMARY

Broadly speaking, the invention relates to image processing for computing environments and computing systems. More particularly, the invention pertains to "structured grids" computations for image processing.

"Structured grids" can be provided as mechanism to arrange data in a regular multidimensional grid (mostly 2D or 3D) whereby computation can proceed by updating a number of grids structured to represent an image according to the information obtained from neighboring grids. Generally, each grid can be updated synchronously or asynchronously. If the grids are updated synchronously, the computation can, for example update all of the grids iteratively. If the grids are updated asynchronously, each grid can, for example, update itself if any of its neighbors are updated.

A wide variety of approaches can be taken to map structured grids computations in parallel, for example, on multi-core computing systems. For example, grids can be divided by columns, by rows, or by regular chunks. Another possibility is to use "multi-grid refinement." For multi-grid modeling, instead of partitioning the data into fixed sized chunks, several copies of the grids are made at various chunk granularities. Coarse-grained chunks can be used to make the more distant updates while the fine-grained chunks can make the detailed propagation.

Typically, an image has a "regular" data arrangement and the graph representation of the image therefore has also a regular data arrangement suitable for a structured grid computations. As such, structured grids computation, among other things, can be used for graph traversal. Given a regular graph representation of an image, each vertex in the graph can be modeled by a grid, or a regular chunk of vertices can be modeled by a grid. The traversal behavior from source vertices to neighboring nodes can be simulated by updating the grid information. However, it should be noted that the computation order can be the reversed. That is, in conventional graph traversal, each source vertex traverses its neighboring vertices directly. In stark contrast, in structured grids computation, each grid can check if it can be updated by a neighboring source grid. If the grids are updated synchronously, the behavior of BFS graph traversal algorithm can be simulated using structured grid computations.

It will be appreciated that the disclosed image processing techniques, among other things, can achieve significantly greater parallelism and scalability than that which can be achieved using conventional techniques. In particular, image processing techniques requiring propagation of information between nodes of an image (e.g. graph traversal) can significantly benefit from the disclosed image processing techniques. As is generally known in the art, in graph traversal, an image can be represented by a number of nodes (e.g., nodes in a graph). The image can be processed in multiple stages or iterations. During a first stage of image processing, the information from one node (e.g., a source node) can be propagated to one or more other nodes (hereinafter referred to as one or more "neighboring nodes"). At a succeeding stage, the information can be propagated from a neighboring node of a source node to other neighboring nodes, and so on. It should be noted that solely for the sake of clarity, any node with information (or including information) that can be propagated to a first node is referred to herein as a "neighboring node" of the first node. However, it should noted that a "neighboring node" need not necessarily be an adjacent node, or even a node physically neighboring or regionally adjacent, since any node that includes information that can be effectively propagated to another node in accordance with an image processing algorithm, is considered to be a "neighboring node."

In accordance with one aspect of the invention, an image represented by multiple nodes can be processed by determining whether information can be propagated to a node from another node (e.g., source node) of the image. In other words, a node of the image can determine whether information can be propagated to it from one or more other nodes (e.g., its neighboring nodes) instead of a source node, determining whether it can propagate information to its neighboring node(s). It will be appreciated that this approach allows a significantly greater parallelism and scalability. As a result, image processing which is typically a highly intensive computing process can be performed more quickly or more efficiently, especially by taking advantage of multiprocessing or multi-core processors that are prevalent and widely available today.

Conceptually, an image can be presented as a "structured grid" of multiple nodes, in accordance with another aspect of the invention (e.g., a structured grid of pixels of an image). As will be appreciated by those skilled in the art, in a "structured grid," two or more of the nodes can perform operations relating to propagation of information (data) in parallel (or substantially or effectively at the same time). In fact, each node of a "structured grid" can perform these operations in parallel. For example, at a given stage of the image processing, each node can determine whether to update itself (or its information) by propagating information from its neighboring node(s) and update itself (or its information) by propagating the information from one or more its neighboring nodes accordingly. This means that for an image of N pixels, it is possible to perform N operations in parallel, thereby achieving far greater degree of parallelism that can be achieved using conventional techniques as will be appreciated by those skilled in the art. It is also possible to divide the processing of N operations for N pixels substantially equally between the number processors or processing cores available at a given time, so that each one of the processors or processing cores is able to process about an equal amount (N/M) of operations in parallel, thereby achieving significantly better scalability than that which can be achieved using conventional techniques, as will also be appreciated by those skilled in the art. It should be noted that each node of the "structured grid" can repeatedly (or iteratively) determine whether to propagate information and propagate the information until information cannot be propagated anymore between the nodes. By way of example, each node of a "structured grid" can effectively determine whether any of the nodes (including the node itself) have been updated, by referencing a global variable.

As an exemplary method for processing an image represented by multiple nodes, by propagating information between one or more of the nodes, one embodiment of the invention can include the acts of: (a) for each node of the image, determining whether to update the node by propagating information from its neighboring nodes to the node, (b) for each node of the image, updating the node by propagating the information from one or more of its neighboring nodes. It should be noted that the determining (a) of whether to update the node and/or the updating (b) of the node can be performed in parallel for two or more of the nodes by using two or more processors or processing cores to achieve parallel processing. As another example, a computing system (e.g., a computing device) can be operable to perform the image processing method noted above. As yet another example, a computer readable (storage) medium can store executable code that when executed, causes a computing system to perform the image processing method noted above.

BRIEF DESCRIPTION OF THE DRAWINGS

The present invention will be readily understood by the following detailed description in conjunction with the accompanying drawings, wherein like reference numerals designate like structural elements, and in which:

FIG. 2A depicts a portion of an exemplary two-dimensional (2D) graph suitable for processing by an IPS in accordance with one embodiment of the invention.

FIG. 4C depicts a representation of a structured grid in accordance with one embodiment of the invention.

DETAILED DESCRIPTION

Figure 1:
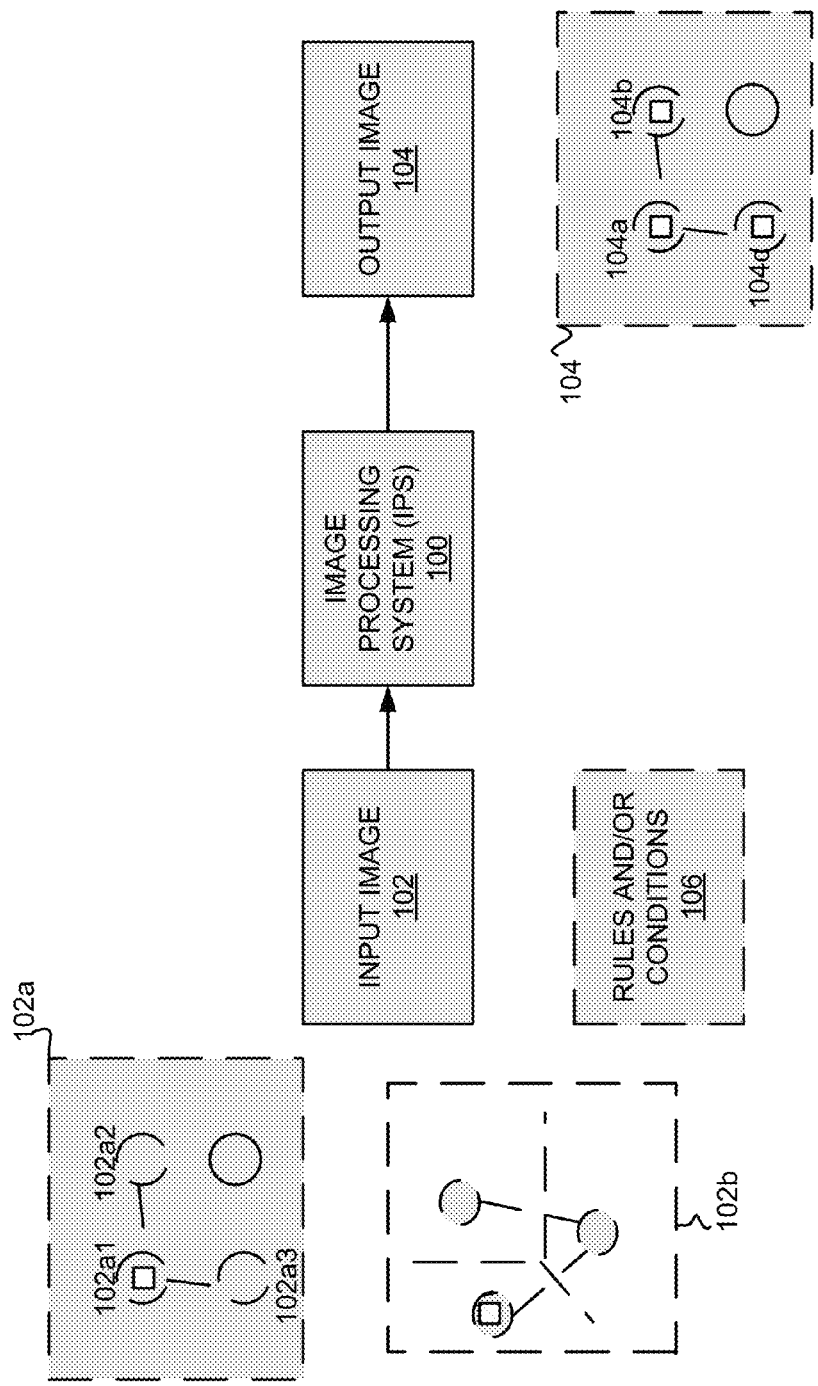
FIG. 1 depicts an Image Processing System (IPS) in accordance with one embodiment of the invention.

As noted in the background section, digital imaging is widely used for numerous applications in various computing environments and systems. As such, image processing techniques are generally useful.

It will be appreciated that the invention pertains to image processing techniques for processing images in computing environments and/or computing systems. Moreover, the disclosed image processing techniques, among other things, can achieve significantly greater parallelism and scalability than that which can be achieved using conventional techniques. In particular, image processing techniques requiring propagation of information between nodes of an image can significantly benefit from the disclosed image processing techniques. As is generally known in the art, an image can be represented by a numbers of nodes (e.g., nodes in a graph). The image can be processed in multiple stages or iterations. In order to apply a structured grids computation on a graph "G (V,E)" v in V can be one pixel in a 2-D image, one voxel in a 3-D image. To be more general, v in V can be a regular chunk of pixels. For example, v can be a 2 pixel by 3 pixel rectangle in an image. For a lower resolution image, usually a node in the graph (a grid in the structured grids) can represent a rectangular region. During a first stage of image processing, the information from one node (e.g., a source node) can be propagated to one or more other nodes (hereinafter referred to as one or more "neighboring nodes"). At a succeeding stage, the information can be propagated from a neighboring node of a source node to other neighboring nodes, and so on. It should be noted that solely for the sake of clarity, any node with information (or including information) that can be propagated to a first node is referred to herein as a "neighboring node" of the first node. However, it should noted that a "neighboring node" need not necessarily be an adjacent node, or even a node physically neighboring or regionally adjacent, since any node that includes information that can be effectively propagated to another node in accordance with an image processing algorithm is considered to be a "neighboring node."

In accordance with one aspect of the invention, an image represented by multiple nodes can be processed by determining whether information can be propagated to a node from another node (e.g., source node) of the image. In other words, a node of the image can determine whether information can be propagated to it from one or more other nodes (e.g., its neighboring nodes), instead of a source node determining whether it can propagate information to its neighboring node(s). It will be appreciated that this approach allows significantly greater parallelism and scalability. As a result, image processing, which is typically a highly intensive computing process, can be performed more quickly or more efficiently, especially by taking advantage of multiprocessing or multi-core processors prevalent and widely available today.

Conceptually, an image can be presented as a "structured grid" of multiple nodes in accordance with another aspect of the invention (e.g., a structured grid of pixels of an image). As will be appreciated by those skilled in the art, in a "structured grid," two or more of the nodes can perform operations relating to propagation of information (data) in parallel (or substantially or effectively at the same time). In fact, each node of a "structured grid" can perform these operations in parallel. For example, at a given stage of the image processing, each node can determine whether to update itself (or its information) by propagating information from its neighboring node(s) and update itself (or its information) by propagating the information from one or more its neighboring nodes accordingly. This means that for an image of N pixels, it is possible to perform N operations in parallel, thereby achieving far greater degree of parallelism than can be achieved using conventional techniques as will be appreciated by those skilled in the art. It is also possible to divide the processing of N operations for N pixels substantially equally between the number processors or processing cores available at a given time so that each one of the processors or processing cores would process about an equal amount (N/M) of operations in parallel, thereby achieving significantly better scalability than that which can be achieved using conventional techniques as will also be appreciated by those skilled in the art. It should be noted that each node of the "structured grid" can repeatedly (or iteratively) determine whether to propagate information and propagate the information until information cannot be propagated anymore between the nodes. By way of example, each node of a "structured grid" can effectively determine whether any of the nodes (including the node itself) have been updated, by referencing a global variable.

Embodiments of these aspects of the invention are discussed below with reference to FIGS. 1-4C. However, those skilled in the art will readily appreciate that the detailed description given herein with respect to these figures is for explanatory purposes, as the invention extends beyond these limited embodiments.

FIG. 1 depicts an Image Processing System (IPS) 100 in accordance with one embodiment of the invention. IPS 100 can be, for example, be provided as a computing system (e.g., a computer) operable to execute executable computer code. As such, as a computing system, IPS 100 can include one or more processors or processing cores (cores), and memory including volatile and non-volatile memory (not shown) as will be readily appreciated by those skilled in the art.

Referring to FIG. 1, IPS 100 can receive (or be operable to receive) input data (or input image) 102 and process it to provide output data (or output image) 104. Generally, data, including input data 102 and output data 104 can be stored in a computer readable storage medium (e.g., memory, a hard disk) as known in the art. The input data 102 can be representative of an image to be processed (or an input image 102) and the output data 104 can be representative of the processed data (or output image 104). The input image 102 being processed can, for example, be a two-dimensional (2D) or three-dimensional (3D) digital image as generally known in the art. Typically, the input data 102 is representative of an image that includes (or is being represented by) multiple node. The nodes can, for example, be part of a graph in a 2D or 3D space, such as, 2D and 3D graphs depicted by the exemplary input data 102a and 102b in FIG. 1.

More specifically, IPS 100 can be operable to effectively process an input image (represented by the input data 102) by propagating information between one or more nodes of the input image. As will be appreciated by those skilled in the art, information can be propagated between the nodes, for example, in accordance with one or more rules and/or when one or more conditions are made. As such, rules and/or conditions data 106 can also be provided as input and received by the IPS 100. In other words, the IPS 100 can be operable to process the input image 102 represented by multiple nodes by propagating information between the nodes. It should be noted that a node can include or can be associated with information (or data) to be propagated between the nodes of the image 102. The information (e.g., a label) can, for example, be used to effectively identify a node as having one or more characteristics (e.g., a node can be effectively identified by a label as a boundary node). Referring to the exemplary input image 102a, a node A (102a1) can include information that can be propagated to other nodes. As a result of the image processing performed by the IPS 100, the information of node A (102a1) can be propagated to nodes B and C (104b and 104c) as shown by the output image 104.

To further elaborate, FIG. 2A depicts a portion of an exemplary two-dimensional (2D) graph 200 suitable for processing by the IPS 100 in accordance with one embodiment of the invention. Graph 200 can, for example, be representative of the input image 102a depicted in FIG. 1. Referring to FIG. 2A, twenty five (25) nodes numbered from one (1) to twenty five (25) are depicted. It should be noted that in the exemplary two-dimensional (2D) graph 200, only nodes seven (7) and nineteen (19) have information. However, this information may effectively be propagated from node seven (7) to nodes numbered as nodes: one (1), three (3), four (4), five (5), six (6) and thirteen (13) when the graph 200 is processed. Similarly, the information of node nineteen (19) may be effectively propagated to nodes numbered as nodes: thirteen (13), eighteen (18), twenty (20), twenty four (24) and twenty five (25). It should be noted that the edges of graph 200 can, for example, be defined based on rules and/or conditions 106 (shown in FIG. 1).

Figure 2B:
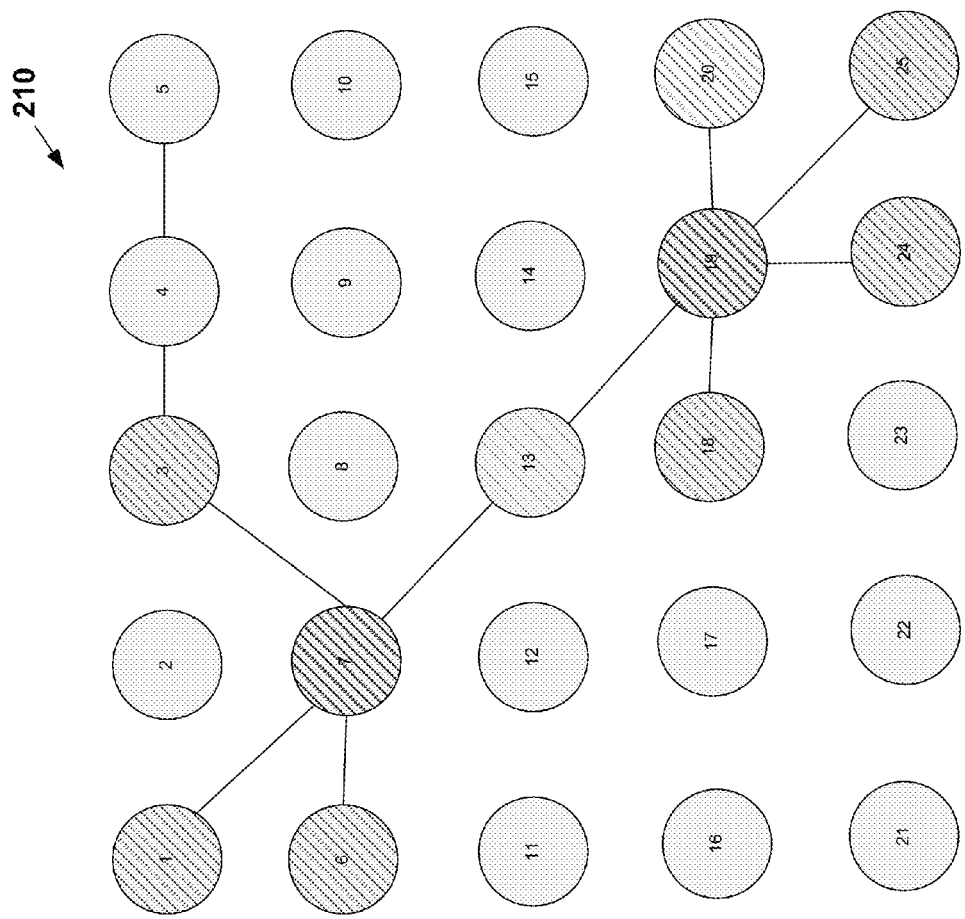
FIG. 2B depicts a graph representative of output of a first processing stage (or first iteration) of image processing that can be performed by an IPS in accordance with one embodiment of the invention.

As noted above, the graph 200 can represent an input image processed by the IPS 100 (shown in FIG. 1). FIG. 2B depicts a graph 210 representative of output of a first processing stage (or first iteration) of image processing that can be performed by the IPS 100 in accordance with one embodiment of the invention. More specifically, when processing the graph 200 (shown in FIG. 2A), the IPS 100 can determine for each node of the graph 200 (node one (1) to node twenty five (25)) whether to update information of the node by propagating information from its neighboring nodes.

Referring to FIG. 2B, conceptually, each one of the nodes one (1) to node twenty five (25) can independently determine whether they have one or more neighboring node with information. As such, in effect, nodes: one (1), three (3), four (4), five (5), six (6) and thirteen (13) can each separately and independently determine that they have a neighboring node, namely node seven (7), with information that can be propagated to them, and separately and independently propagate the information from seven (7) to themselves. Similarly, nodes thirteen (13), eighteen (18), twenty (20), twenty four (24) and twenty five (25) can independently and separately propagate the information of node nineteen (19) to themselves. It should be noted that in stark contrast to conventional techniques that would effectively propagate information from the perspective of nodes seven (7) and thirteen (13), which are often referred to as "source" nodes, the IPS 100 can effectively propagate information from the perspective of each and every node. As a result, a node, such as, for example, node eight (8) could also check for a neighboring node even though the node would not or could not propagate information in accordance with applicable rules (e.g., node eight (8) is not "connected" to another node in the graph 210, so information cannot be propagated to it).

However, it will be appreciated that operations performed for each node can be performed in parallel or effectively at the same time. In other words, for graph 210, twenty five (25) separate operations, one for each node, can be performed in parallel. Conceptually, this means that each node of the graph 210 can determine in parallel with the other nodes of the graph 210 whether the node has a neighboring node and/or propagate the information to the neighboring node if the node determines that it has a neighboring node.

Figure 2C:
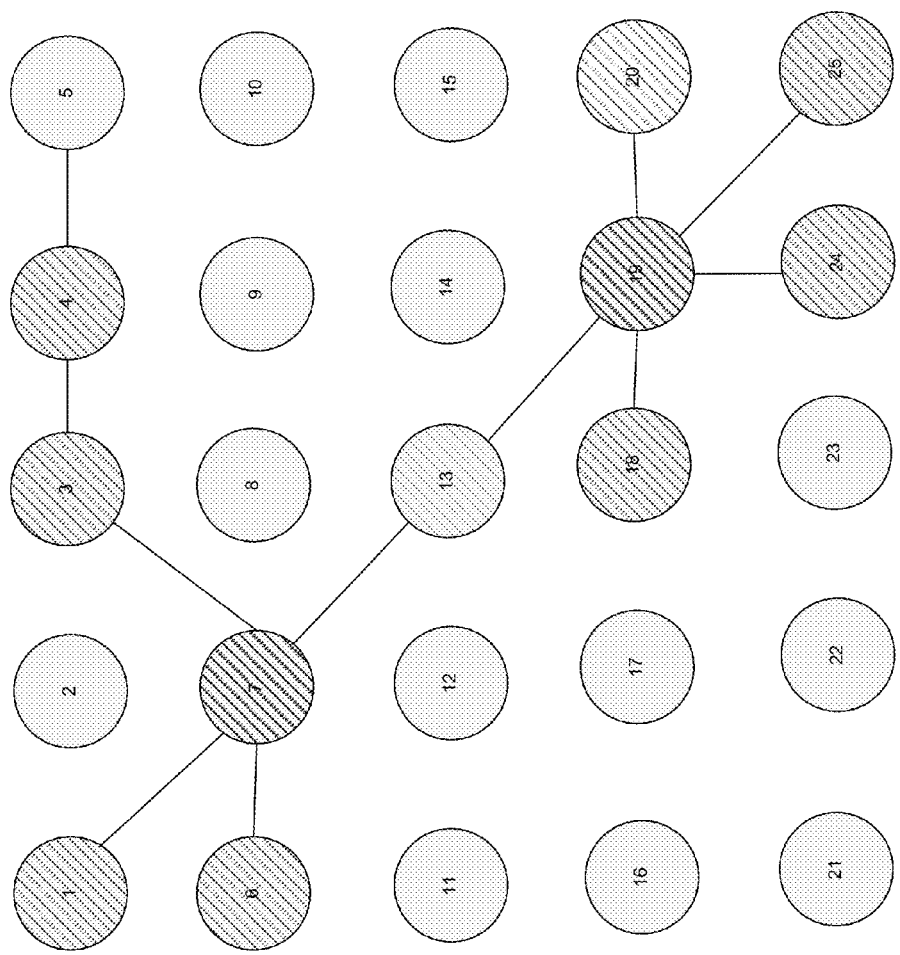
FIG. 2C depicts a second stage (or iteration) of the processing that can be performed by an IPS in accordance with the one embodiment of the invention.

It should be noted that each node of the graph 210 can effectively continue to check whether to propagate information from a neighboring node, so long as information has been propagated by at least one node in a previous stage or iteration. To further elaborate, FIG. 2C depicts a second stage or iteration of the processing that can be performed by the IPS 100 in accordance with one embodiment of the invention. Referring to FIG. 2C, at the second stage or iteration of the process, node four (4) effectively propagates the information from three (3). It should be noted that the information was previously propagated by node three (3) from node seven (7) in the first stage or iteration of the processing depicted in FIG. 2B. It should be noted that in the first stage or iteration of the processing (shown in FIG. 2B), node four (4) does not propagate any information from node three (3), but the processing continues or iterates to the second stage where node four (4) can determine that it has a neighboring node with information, namely, node three (3), and can propagate the information from the node three (3) to itself. It should be noted that rules and/or conditions 106 (shown in FIG. 1) can, for example, be used to not allow updating of node seven (7) from nodes one (1), six (6) and thirteen (13).

Figure 2D:
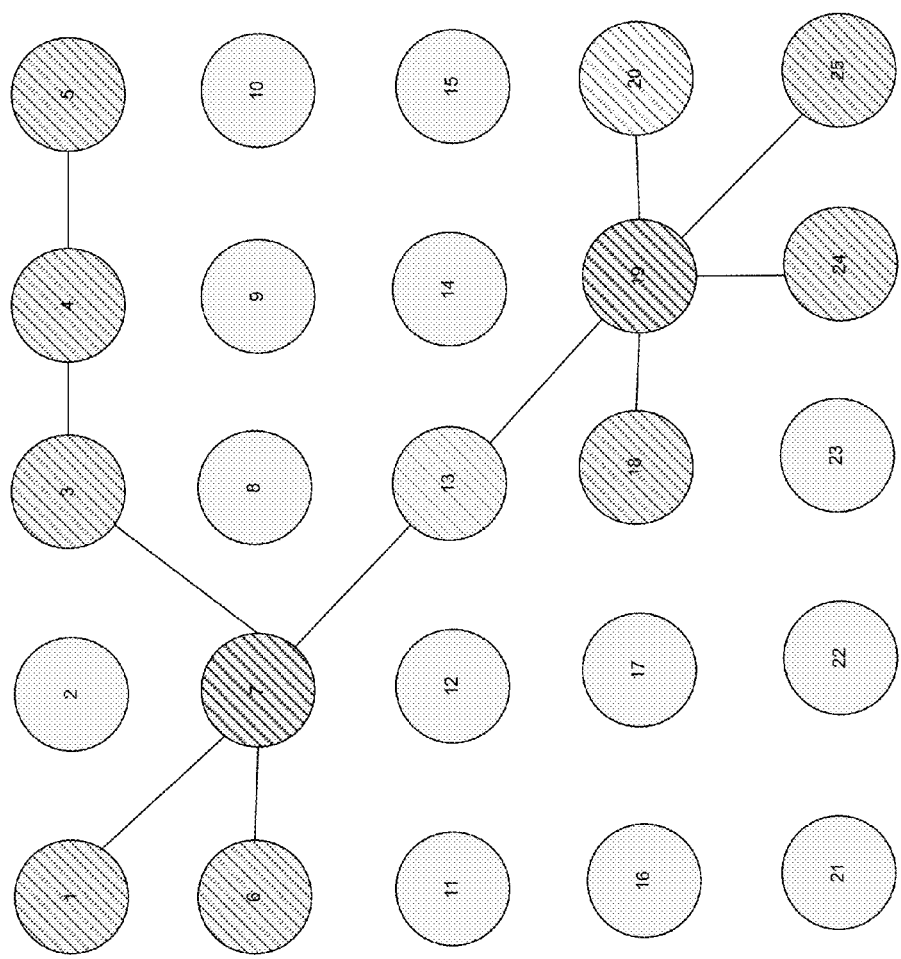
FIG. 2D depicts a third stage of the processing that can be performed by an IPS in accordance with one embodiment of the invention.

Similarly, in a third stage or iteration of the process, node five (5) can effectively propagate the information from node four (4) after node four (4) obtains the information from node there (3), and so on. FIG. 2D depicts a third stage or iteration of the processing that can be performed by the IPS 100 in accordance with one embodiment of the invention. This processing can continue until it is determined that in the previous stage or iteration, no node has propagated information. As such, after a fourth iteration of the process, no information can be propagated by any one of the nodes, and the processing can complete. Those skilled in the art will readily know that the determination of whether any one of the nodes has been updated can, for example, be made by using a global variable. In addition, the status of nodes for at least two stages or interactions of the process (e.g., current and previous iterations) can be stored. Moreover, those skilled in the art will appreciate that the IPS 100 can conceptually use a "structured grid" or "structured grids computations" for processing an image. In particular, the "structured grid" is highly suitable for implementing various Breadth First Search (BFS) graph traversal algorithms.

Figure 3:
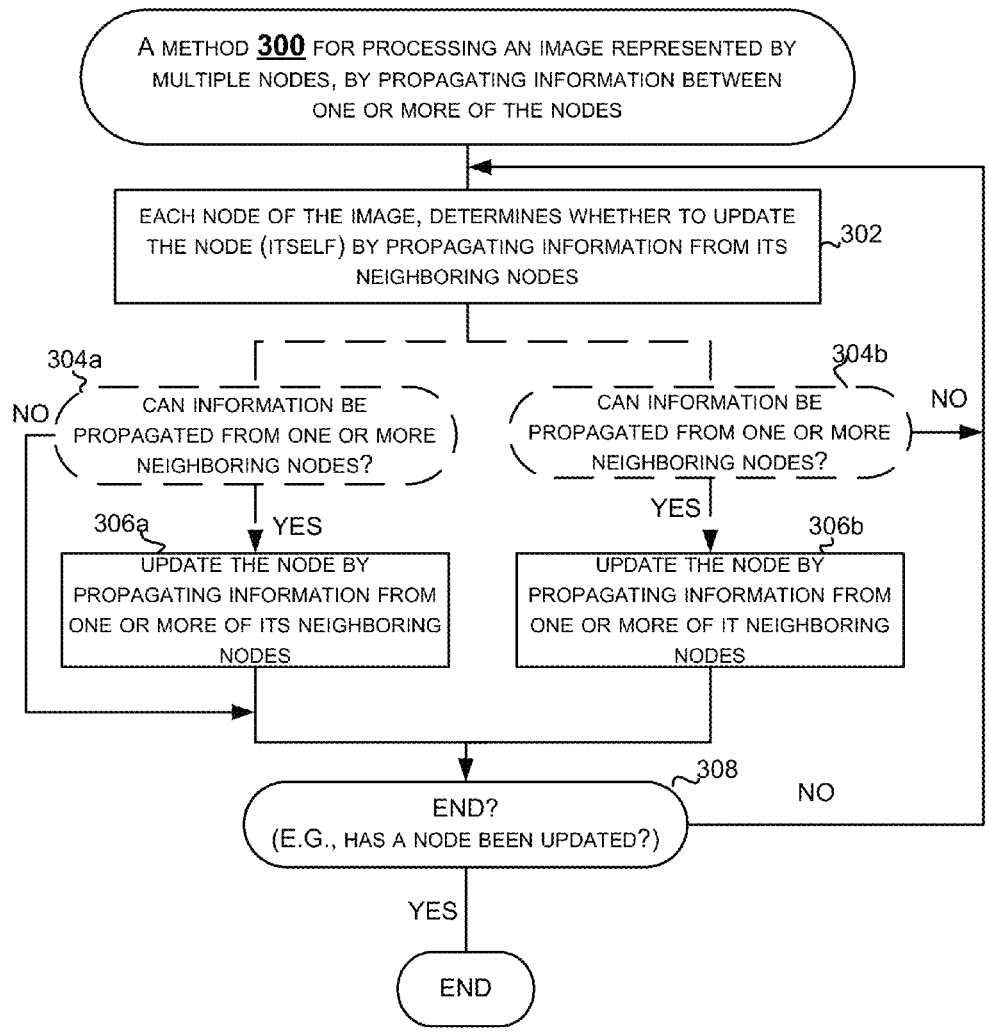
FIG. 3 depicts a method for processing an image represented by multiple nodes, by propagating information between one or more of nodes of an image in accordance with one embodiment of the invention.

FIG. 3 depicts a method 300 for processing an image represented by multiple nodes, by propagating information between one or more of the nodes of the image in accordance with one embodiment of the invention. Method 300 can, for example, be performed by the IPS 100 depicted in FIG. 1.

Referring to FIG. 3, initially, each node of the image determines (302) whether to update itself (or the information associated with the node) by propagating information from its neighbors (or neighboring nodes). It should be noted that each node can make this determination (or this determination can be made on behalf of each node) independently and separately from the other nodes (or determinations made on behalf of other nodes). Moreover, each node can make this determination in parallel, or substantially or effectively simultaneously with or at the same time, as the other nodes. As such, multiple determinations or decisions can be made separately and independently, as suggested by 304a and 304b depicted in FIG. 3 and depending on the outcome of the determining or decisions 304a and 304b, each node can update itself (or its information) separately and independently from the other nodes, by propagating information from it neighboring nodes, as shown by operations 306a and 306b. It should be noted that operations 306a and 306b can be made in parallel, or substantially or effectively simultaneously with or at the same time as the other nodes. Thereafter, it can be determined (308) to end the processing of the image. Generally, this determination (308) can be made based on one or more criteria depending, for example, on whether the nodes are updated synchronously or asynchronously. If the nodes are updated asynchronously, this determination (308) can be made on various criteria by the nodes. If the updated synchronously, the determination (308) can, for example, be made based on whether any node has been updated by each node independently and separately from other nodes (e.g., by checking a global variable that can be set by any node after it updates itself by propagating information from the neighboring nodes). Alternatively, this determination (308) can be made once. In any case, if it is determined (308) not to end processing of the image, method 300 proceeds to determine (302), for each node, whether to update the node by propagating information from one or more of the node neighbors (or the node's neighboring nodes). Method 300 can continue in a similar manner as discussed above until it is determined (308) to end processing of the image. It should be noted that if information can be propagated from multiple neighboring nodes, then an order of propagation can be determined and information can be propagated in accordance with the determined order. Generally, information from multiple neighboring nodes can be propagated in any way deemed appropriate (e.g., propagating based on an order, propagating from one or more selected neighbors and ignoring information from one or more other neighbors).

Figures 4A, 4B:
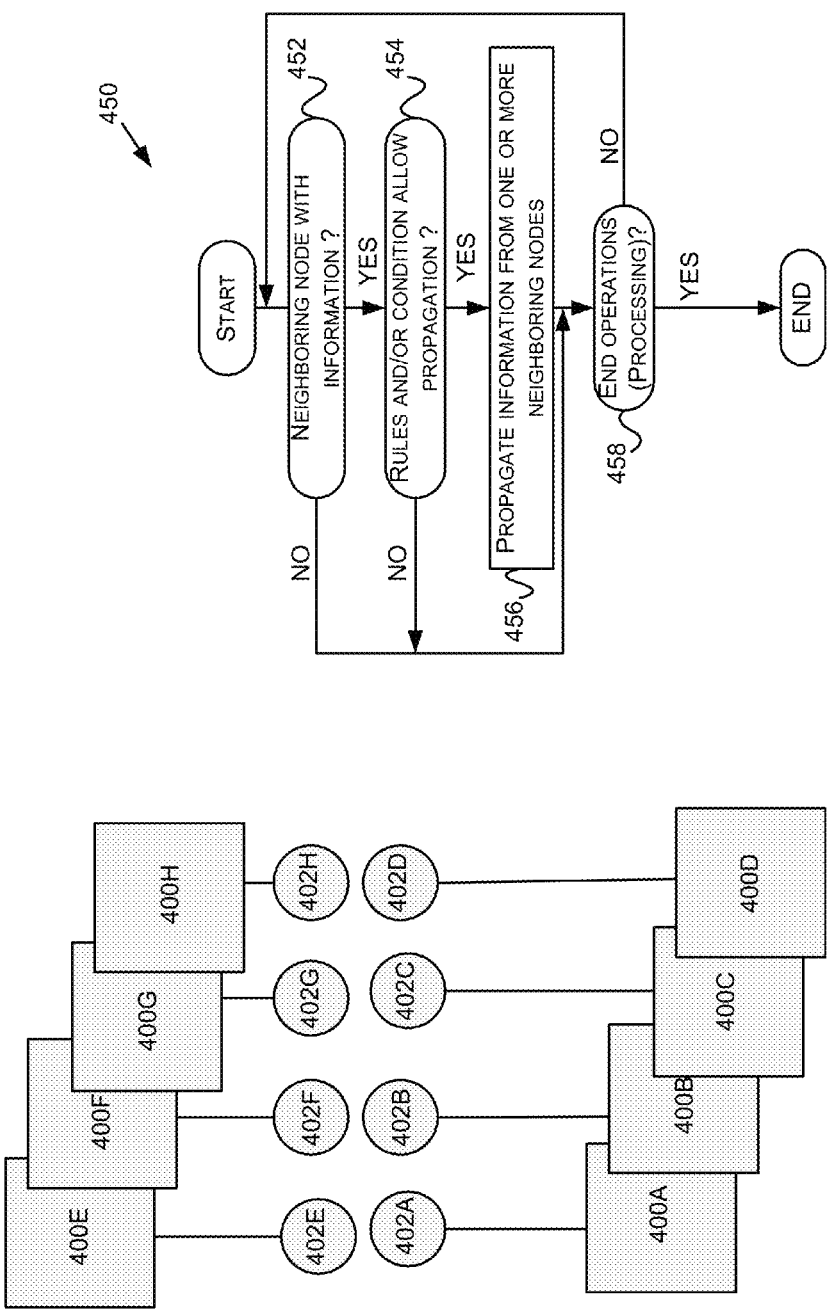
FIGS. 4A and 4B depict exemplary operations that can be performed in parallel for nodes of an image in accordance with one embodiment of the invention.

As noted above, method 300 (depicted in FIG. 3) is especially suited for parallel processing applications. More particularly, at each iteration or stage of the image processing, operations for each node of an image can be processed in parallel in accordance with the invention. To elaborate even further, FIG. 4A depicts a number of nodes being processed in parallel by multiple processors and/or processing cores 400 in accordance with one embodiment of the invention. Nodes 402 can, for example, represent the nodes of an image being processed by the method 300 depicted in FIG. 3. Referring to FIG. 4A, at an iteration of an image processing method, operations associated with each node 402 of the image can be performed by a processor or a processing core 400 in parallel. As such, at a given iteration or stage of image processing, operations associated with node 402A can be executed on a processor or processing core 400A in parallel with operations associated with another node 402B executed on another processor or processing core 400B, and so on. This means that at a given iteration or stage of processing an image represented by a number of (N) nodes, the same number (N) of processors or processing cores can be used to effectively execute operations associated with all of the N nodes of the graph in parallel with each other.

FIG. 4B depicts exemplary operations 450 that can be performed in parallel for nodes of an image in accordance with one embodiment of the invention. By way of example, operations 450 can be performed in parallel by each one of the nodes 452 depicted in FIG. 4B. Conceptually, operations 450 can be performed by a node or from the perspective of a node. Referring to FIG. 4B, initially, a node can determine (452) whether it has a neighboring node. If the node determines (452) that it does not have a neighboring node, the node need not perform any additional operation or the operations 450 can end. On the other hand, if the node determines (452) that it has at least one neighboring node with information, the node can determine (454) whether one or more rules and/or conditions allow propagation of the information from the one or more neighboring nodes. If the node determines (454) not to propagate the information, the node need not perform any additional operation or the operations 450 can end. Otherwise, the node can propagate (456) information from one or more of the nodes with information. It should be noted that a node can generally determine (458) whether to end its operations (or processing) and the operations 450 can end accordingly. As noted above, this determination (458) can, for example, be made based on a global variable indicative of no change in any of nodes.

Figure 4C:
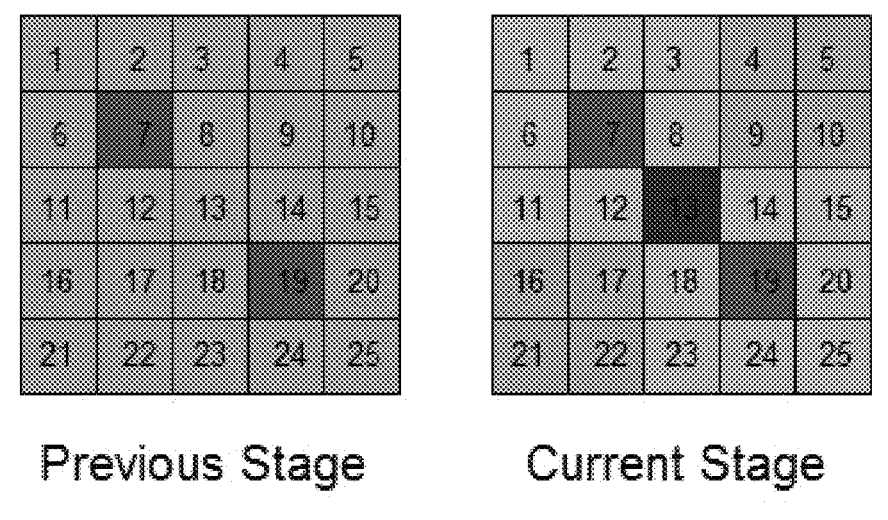

It will be appreciated that the invention can be utilized for parallelizing graph traversal on images by using structured grids for simulating the propagation behavior of graph traversal. In a conventional graph traversal algorithm, source nodes actively propagate information to their nearby neighbors. In contrast, in a structured grids computation (or computational model), the source nodes become passive and each node can check whether information can be propagated to it by some sources. In essence, the computation is reversed. Referring to FIG. 4C, grids 7 and 19 are source nodes that would transfer information to their neighboring pixels. In conventional graph traversal algorithms, grid 7 would transfer information to grids 1, 2, 3, 6, 8, 11, 12, and 13, and grid 19 would transfer information to grids 13, 14, 15, 18, 20, 23, 24, and 25. Even though grid 7 and grid 19 can propagate information to their nearby neighbors in parallel, there are still 8 serial propagation computations for each source node. In comparison, in a structured grids computation, all the 25 grids can check their nearby neighbors to see whether they can be updated by their neighbors. As such, one propagation computation is enough for updating the status of all the grids. A structured grid can be used for a BFS graph traversal.

A structured grids computation for simulating the behavior of BFS graph traversal is summarized below. It should be noted that Variable "i" is a counter for the structured grids iterations. $P_0, P_1, \ldots, P_i, \ldots$ are the propagation results after iteration i. Initially, $P_0$ is set to S. That is, information is only stored on the pixels which are in the source nodes set S. The information on all other pixels is empty. In lines 3 to 9 the status of each pixel by structured grids computations can be iteratively updated. It should be noted that the variable "changed" is a global variable that can be accessed by all processors. If there is any change in any pixel, the global variable "changed" will be set as true. Otherwise, it will remain as false. There is no need to know which particular pixel has been updated. It is enough to know whether any pixel has been updated. As such, there is no need for synchronization or locking for setting the global variable "changed." On line 6, the computation of updating the status of each pixel can be distributed to all the available processors. Because the computation on each pixel can be the same and independent, the processing work can be evenly distributed to all available processors. If no pixel has changed, then the structured grids computation will stop on line 9, and the latest results are returned on line 10.

```
Input:   I    // The input image.
    S    // Initial set of source nodes, from which information
         can be propagated.
    R    // Rules specifying whether the information can be
         propagated from a pixel to another pixel.
    N    // The definition of neighbors of a pixel.
Output:  P    // Final image with proper information stored in each
              pixel
Structured_Grids_Propagation (I, S, R, N)
1. i ← 0;
2. P_0 ← S;
3. while (true)
4.     i ← i + 1;
5.     changed ← false;
6.     for each pixel p in I
7.         P_i←Check_Update(p, I, P_{i-1}, R, N, changed);
8.     if (changed == false)
9.         break;
10. return P_i;
```

The Check_Update subroutine shown below provides exemplary computations that can be done in each pixel, during each structured grids computation. All processors can use this subroutine for updating the status on each pixel in parallel. In lines 1 to 5, the subroutine verifies whether there is any information that can be propagated to pixel p from its neighbors N(p). On line 3, the propagation of information is valid, if and only if the neighbor pixel q and p satisfy the propagation rule R(q, p) and the information in q is not empty. On lines 6 through 8, if there needs to be multiple information propagations to p, the order of information propagation can first be decided, and the propagation can then be performed according to the order we have specified. No race condition will occur here, since we can decide the propagation order before doing the propagation. On lines 9 and 10, if there is only one neighbor that can propagate information to p, then that is immediately done. On lines 11 and line 12, we check the status of pixel p. If the status of p has changed, then we set the global variable "changed" to true.

```
Check_Update (p, I, P_{i-1}, R, N, changed)
1. valid_num ← 0;
2. for q in N(p)
3.     if ((R(q, p) == true) AND (information(P_{i-1}, q) != empty))
4.         valid(q) ← true;
5.         valid_num ← valid_num + 1;
6. if (valid_num > 1)
7.     order ← Decide_Propagation_Order(valid, p, I, P_{i-1}, R, N);
8.     Propagate_Multiple_Information(order, p, I, P_{i-1}, R, N);
9. if (valid_num == 1)
10.    Propagate_Single_Information(valid, p, I, P_{i-1}, R, N);
11. if (Information(p) != Information(P_{i-1}, p))
12.    changed ← true;
```

In comparison to conventional parallel BFS graph traversal algorithms, several advantages can be realized by applying structured grids for simulating graph traversal behavior. One such advantage is a relatively larger degree of parallelism. For existing parallel BFS graph traversal algorithms, the computation on source nodes can be done in parallel. However, in a structured grids computation, all the nodes connecting to the source nodes can be updated in parallel. In general, the number of source nodes is much smaller than the number of nodes they are connected to. Therefore, the structured grids computation can express larger parallelism. Referring to FIG. 4C, as an example, if grids 7 and 19 can propagate information in parallel, it achieves 2-way parallelism. For the structured grids computation, grids 1, 2, 3, 6, 8, 11, 12, 13, 14, 15, 18, 20, 23, 24, and 25 can update their status in parallel. It is 15-way parallelism. Larger than the naïve 2-way parallelism method.

Another advantage of applying structured grids for simulating graph traversal behavior is better scalability and load balancing. For graph traversal algorithms, usually it is not known in advance how much computation is required for each one of the different source nodes in order to propagate information. Therefore, it is hard to balance work loads for different processors. Conventional distributed graphs have a hard time defining balanced graph partitions. The task queue approaches can have a better balancing performance. However, the task collection and redistribution can be expensive. For the structured grids, the computations on all grids can all be the same. As such, the work load can be more easily balanced. Moreover, if more processors are available, more grids can be updated in parallel. So, the scalability is linear to the number of processors.

Yet another advantage of the invention is that "race conditions" can be eliminated. If several source nodes are propagating information to the same grid, the update ordering of the grid is generally non-deterministic, so race conditions can occur and must be accounted for. However, for structured grids calculations, before a grid updates itself, it can check all its neighbors that can transfer information to it, and decide the access ordering by itself so no race conditions will occur. Referring back to FIG. 4C, for grid 13 in FIG. 4, it knows that both grid 7 and grid 19 are propagating information to it, so it can decide how to deal with the information from both sides.

The following discussion compares computational complexities of a serial graph traversal algorithm, an existing parallel graph traversal algorithm, and a structured grids approach. Assuming there are n source nodes, information from each source node will be propagated to $a_1, a_2, \ldots, a_n$ pixels, respectively. The computational complexity of serial algorithm is $$O\left(\sum_{i=1}^{n} a_i\right).$$

For an existing parallel graph traversal algorithm with p processors, because the work loading is hard to control, it is assumed that each processor take care of n/p source nodes. The computational complexity is $$O\left(\frac{n}{p}\max_i(a_i)\right),$$

and the upper bound of the number of processors is n. For the structured grids computation, let the number of grids (the number of pixels in the image) be m, and the maximum distance a source node i can propagate is $d_i$, the computational complexity is $$O\left(\frac{m}{p}\max_i(d_i)\right),$$

and now p can scale to m. Suppose we have m processors, then the performance for the parallel structured grids computation compared to the parallel graph traversal is $O(\max(a_i))$ against $O(\max(d_i))$. Usually $O(\max(a_i))=O((\max(d_i))^2)$, so the structured grids method has a large advantage over the parallel graph traversal method.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method of parallel processing an image comprising a plurality of nodes, the method comprising:
    (a) for each node of said image, determining whether to update said node based on propagation information from one or more neighboring nodes, wherein determining whether to update said node comprises verifying whether information can be propagated to said node from said one or more neighboring nodes based on one or more rules relating to balancing work load for a structure grid nodes;
    (b) for each node of said image to update, updating said node by determining an order of information propagation, and propagating information from one or more neighboring nodes to said node in said determined order of information propagation;
    (c) determining whether any of said plurality of nodes has been updated; and
    (d) repeating (a), (b) and (c);
    wherein at least one of (a) and (b) is performed in parallel for two or more of said plurality of nodes.

2. The method of claim 1, wherein:
    each node repeatedly determines whether to update said node until (c) determines that no node has been updated;
    said plurality of nodes are represented as a structured grid of nodes, wherein each node of said structured grid corresponds to a node of said image;
    at least one of the following is performed in parallel for each node of said structured grid: (a) and (b).

3. The method of claim 1, wherein:
    at least one of (a), (b) and (c) is performed in parallel for two or more of said plurality of nodes.

4. The method of claim 1, wherein:
    said image is represented by a graph that includes said plurality of nodes; and
    said processing of said image is for Graph Traversal of said graph.

5. The method of claim 4, wherein said Graph Traversal traverses said graph in accordance with Breadth First Search (BFS) ordering of said plurality of nodes.

6. The method of claim 5, wherein:
    said Breadth First Search (BFS) ordering of said plurality of nodes is associated with one or more source nodes of said graph, wherein each source node has information that is propagated to at least one node based on one or more rules or one or more conditions.

7. The method of claim 1, wherein:
    said image can be represented as a graph with multiple nodes, wherein each node of said graph corresponds to a node of said image, and wherein said nodes of said image are connected in accordance with edges of said graph that define neighboring nodes; and
    (a) and (b) are performed in parallel for a first node and a second node by a first processing core unit and a second processing core unit, respectively, wherein:
    said first processing core unit determines whether to update said first node, and updates said first node by propagating information from one or more neighboring nodes to said first node if an update for said first node is determined; and
    said second processing core unit determines whether to update said second node, and updates said second node by propagating information from one or more neighboring nodes to said second node if an update for said second node is determined.

8. The method of claim 1, wherein:
    said first processing core unit further determines whether information for said first node has been updated; and
    said second processing core unit further determines whether information for said second node has been updated.

9. The method of claim 1, wherein each node corresponds to a pixel of said image.

10. The method of claim 1, wherein said information propagating between said plurality of nodes comprises at least one label.

11. The method of claim 1, wherein said processing of said image is for image recognition.

12. The method of claim 1, wherein (a), (b) and (c) are repeated until (c) determines that none of said plurality of nodes has been updated.

13. The method of claim 1, wherein said processing is used for one or more of the following: edge extraction, filling a region, finding local minimums or maximums, boundary detection or erosion, distance transformation, and skeletonization.

14. The method of claim 1, wherein propagation of information is done in accordance with Breadth First Search (BFS).

15. The method of claim 1, wherein (a) further comprises:
    (a1) determining whether said node has at least one neighboring node with information; and
    (a2) if said node has at least one neighboring node with information, determining, based on one or more rules or conditions, whether to propagate information from said at least one neighboring node to said node.

16. The method of claim 1, wherein the computer-implemented method further comprises one or more of the following:
  repeating (a), (b) and (c) until a condition is satisfied; and
  repeating (a), (b) and (c) for a predetermined number of iterations.

17. A computing system, wherein the computing system is operable to:
  (a) for each node of an image, determine whether to update said node by based on propagation information from one or more neighboring nodes, wherein determining whether to update said node comprises verifying whether information can be propagated to said node from said one or more neighboring nodes based on one or more rules relating to balancing work load for a structure grid node;
  (b) for each node of said image to update, update said node by determining an order of information propagation, and propagating said information from one or more neighboring nodes to said node in said determined order of information propagation;
  (c) determine whether any node has been updated; and
  (d) repeating (a), (b) and (c) until (c) determines that no node has been updated.

18. The computing system of claim 17, wherein said computing system is further operable to:
  represent said image as a structured grid of nodes, wherein each node of said structured grid corresponds to a node of said image; wherein at least one of the following is performed in parallel for each node of said structured grid: (a) and (b); and
  wherein each node repeatedly determines whether to update said node until (c) determines that no node has been updated.

19. The computing system of claim 17, wherein said computing system is further operable to perform at least one of (a), (b) and (c) in parallel for two or more of nodes of said image.

20. A non-transitory computer readable storable medium storing at least computer executable code that when executed causes a computer to perform a computer-implemented method for processing an image comprising a plurality of nodes, the computer-implemented method comprising:
  (a) for each node of said image, determining whether to update said node based on propagation information from one or more neighboring nodes, wherein determining whether to update said node comprises verifying whether information can be propagated to said node from said one or more neighboring nodes based on one or more rules relating to balancing work load for a structure grid node;
  (b) for each node of said image to update, updating said node by determining an order of information propagation, and propagating information from one or more neighboring nodes to said node in said determined order of information propagation;
  (c) determining whether any of said plurality of nodes has been updated; and
  (d) repeating (a), (b) and (c) until (c) determines that no node has been updated;
  wherein at least one of (a) and (b) is performed in parallel for two or more of said plurality of nodes.

21. The non-transitory computer readable storable medium of claim 20, wherein the computer-implemented method further comprises:
  performing at least one of (a), (b) and (c) in parallel for two or more of said plurality of nodes;
  wherein said plurality of nodes are represented as a structured grid of nodes, wherein each node of said structured grid corresponds to a node of said image;
  wherein each node repeatedly determines whether to update said node until (c) determines that no node has been updated.

* * * * *